(12) United States Patent
Thompson

(10) Patent No.: US 9,037,407 B2
(45) Date of Patent: May 19, 2015

(54) METHOD AND SYSTEM FOR DETERMINING POSITION OF AN INERTIAL COMPUTING DEVICE IN A DISTRIBUTED NETWORK

(75) Inventor: James Thompson, Stanford, CA (US)

(73) Assignee: PALANTIR TECHNOLOGIES INC., Palo Alto, CA (US)

(*) Notice: Subject to any disclaimer, the term of this patent is extended or adjusted under 35 U.S.C. 154(b) by 469 days.

(21) Appl. No.: 13/181,392

(22) Filed: Jul. 12, 2011

(65) Prior Publication Data

US 2012/0010812 A1 Jan. 12, 2012

Related U.S. Application Data

(60) Provisional application No. 61/363,582, filed on Jul. 12, 2010.

(51) Int. Cl.
*G01C 21/00* (2006.01)
*G01C 21/16* (2006.01)

(52) U.S. Cl.
CPC .................................. *G01C 21/16* (2013.01)

(58) Field of Classification Search
CPC ................................. G01C 21/00; G01C 21/16
USPC ............... 701/400–541; 340/901, 902, 932.2, 340/988, 426.1, 425.5, 426.7, 426.9, 426.2, 340/426.21, 445, 995.13; 342/357.27, 342/357.31, 357.34, 357.43, 357.44, 342/357.58, 357.59, 357.63, 357.66, 357.74
See application file for complete search history.

(56) References Cited

U.S. PATENT DOCUMENTS

| | | | |
|---|---|---|---|
| 5,021,792 A * | 6/1991 | Hwang | 342/357.31 |
| 5,555,503 A * | 9/1996 | Kyrtsos et al. | 701/518 |
| 5,670,987 A | 9/1997 | Doi et al. | |
| 6,642,945 B1 | 11/2003 | Sharpe | |
| 7,383,053 B2 * | 6/2008 | Kent et al. | 455/456.5 |
| 7,652,622 B2 * | 1/2010 | Hansen et al. | 342/357.66 |
| 7,725,547 B2 | 5/2010 | Albertson et al. | |
| 2003/0227746 A1 * | 12/2003 | Sato | 361/686 |
| 2004/0203380 A1 * | 10/2004 | Hamdi et al. | 455/41.2 |
| 2006/0116991 A1 | 6/2006 | Calderwood | |
| 2006/0206235 A1 * | 9/2006 | Shakes et al. | 700/216 |
| 2006/0250764 A1 * | 11/2006 | Howarth et al. | 361/683 |
| 2007/0130541 A1 * | 6/2007 | Louch et al. | 715/804 |
| 2008/0007618 A1 * | 1/2008 | Yuasa | 348/118 |
| 2009/0005070 A1 | 1/2009 | Forstall et al. | |
| 2009/0265105 A1 * | 10/2009 | Davis et al. | 701/300 |
| 2009/0315679 A1 * | 12/2009 | Bauchot et al. | 340/10.1 |
| 2010/0073315 A1 | 3/2010 | Lee et al. | |
| 2010/0306713 A1 | 12/2010 | Geisner et al. | |
| 2011/0310005 A1 | 12/2011 | Chen et al. | |
| 2012/0036434 A1 | 2/2012 | Oberstein | |

\* cited by examiner

*Primary Examiner* — Jason Holloway
*Assistant Examiner* — Rachid Bendidi
(74) *Attorney, Agent, or Firm* — Knobbe, Martens, Olson & Bear LLP

(57) ABSTRACT

A system for retrieving information about a position of an inertial computing device (ICD) for use in an application, which includes a network of local positioning docks (PDs), each capable of docking an ICD by restricting three dimensions of a physical position of the ICD near one of the PDs; a database capable of storing information about the positions of the PDs within the network; a calculator capable of determining, based on a position of a positioning dock (PD), the position of the ICD; and an application programming interface (API) connected to the database and capable of outputting the position of a PD to the ICD.

29 Claims, 6 Drawing Sheets

US 9,037,407 B2

METHOD AND SYSTEM FOR DETERMINING POSITION OF AN INERTIAL COMPUTING DEVICE IN A DISTRIBUTED NETWORK

CROSS-REFERENCE TO RELATED APPLICATIONS

This application claims the benefit of U.S. Provisional Application No. 61/363, 582, filed Jul. 12, 2010, which is incorporated in its entirety by this reference.

BACKGROUND

As mobile computing becomes more popular, opportunities for augmented reality become greater. Current technologies generally rely upon global positioning systems (GPS), accelerometer sensors, and magnetometers combined with image systems to provide alternate realities or position-related applications. Such applications typically rely on rich maps and geographic positions of locations of interest. The fidelity of such interactions, however, is limited by the positioning accuracy of the device, which relies heavily on the GPS and magnetometer capabilities of the device. While such devices work fine in an ideal environment, they are not as robust in environments such as dense urban areas and indoor locations. Additionally, because of the dependence on geographic and map data sets, these applications are limited in scope. Thus, there is a need in the augmented reality field to create a new and useful method and system for locating an inertial computing device (ICD) in a distributed network. This invention provides such a new and useful method and system.

DESCRIPTION OF THE PREFERRED EMBODIMENTS

The following description of the preferred embodiments of the invention is not intended to limit the invention to these preferred embodiments, but rather to enable any person skilled in the art of augmented reality to make and use this invention.

1. System for Determining Position of an Inertial Computing Device

Figure 1:
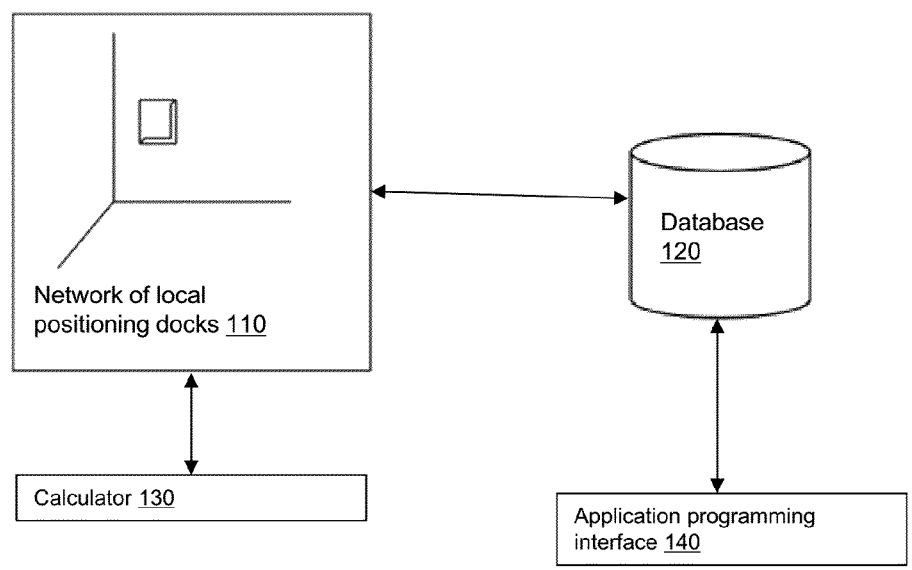
FIG. 1 is a schematic representation of a system of a preferred embodiment of the invention.

As shown in FIG. 1, a system 100 for determining position of an inertial computing device (ICD) of a preferred embodiment includes a network 110 of local positioning docks (PDs), each capable of docking an ICD by restricting three dimensions of a physical position of the ICD near one of the PDs; a database 120 capable of storing information about the positions of the PDs within the network; a calculator 130 capable of determining, based on a position of a positioning dock (PD), the position of the ICD; and an application programming interface (API) 140 connected to the database and capable of outputting the position of a PD to the ICD. The ICD is preferably a mobile phone, but may be any suitable computing device with position and/or orientation sensing capabilities such as a laptop computer, a tablet computer, a game controller, or any device with suitable positioning technology. The ICD preferably includes a global positioning system (GPS), a gyroscope sensor, an accelerometer sensor, an electric compass/magnetometer, camera/imaging system, and/or any suitable sensor or device for positioning. As used within this document, "position" refers to location (e.g., geographic or local, 2D or 3D) and orientation (e.g., linear or rotational angle, velocity, acceleration etc.) of the ICD. Alternatively, position may refer to only location or only orientation. A PD is preferably a device that can receive the ICD and facilitates orienting the ICD in a singular position for synchronizing of positions. The system functions to create a distributed network of reference points useable by a plurality of devices and offering high fidelity positioning for various applications. The system is preferably used for a plurality of PDs with interrelating position calibrations of PDs and position-associated data. The system is preferably used to implement augmented reality-based applications through the ICD, but may alternatively be used for any suitable position-based application.

Figure 3:
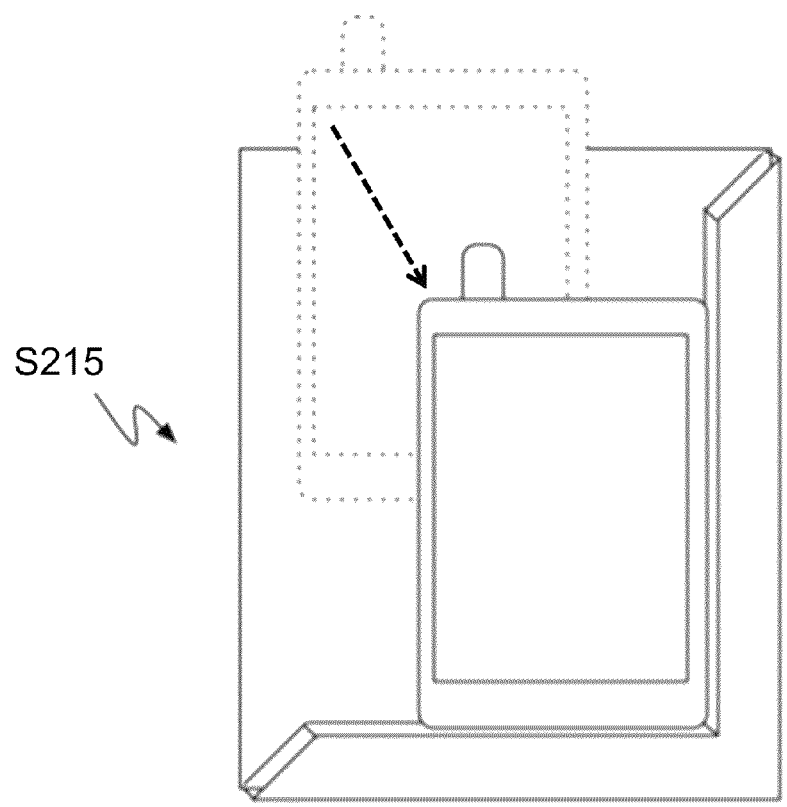
FIG. 3 is a detailed schematic representation of receiving the ICD within a positioning dock (PD)

The local PDs in the network no of the preferred embodiment function to be local orienting fixtures for an ICD. The forms of the PDs no preferably facilitate the locating/fixing of a position of the ICD. The PDs in the network no preferably include recesses in which the ICD fits and is in a known and standard orientation. In one variation this is preferably a three-walled corner in which the ICD may be fully constrained when a user applies an opposing force toward the corner, as shown in FIG. 3. The PDs in one variation are preferably formed of plastic and protruding from a wall to define confining structures. The confining structures are preferably designed to apply to a variety of ICD models, but may alternatively be specifically designed for a single model, taking into account a specific structural design of the ICD.

The PDs in the network no are preferably capable of "docking" an ICD, or restricting three dimensions of the physical position of the ICD near one of the PDs. Docking functions to assign a local standard or origin for synchronizing the position of the ICD. The local standard or origin is preferably determined by a calibrated position. The calibrated position preferably includes the location of the PD within a global reference frame or coordinate system such as using GPS and additionally the orientation of the PD. The calibrated position may alternatively be a local reference frame with no reference to an external/global coordinate system. The calibrated position may alternatively include references to other local PDs. When calibrating the position of the PD, the position is preferably assigned to a PD identity stored in the database. Assigning the position to a PD identity preferably enables a network of PDs to be passive docks that facilitate orientating an ICD and distinguish the PD from other PDs. This preferably functions to enable PDs to be more affordable and ubiquitous within an environment. A PD preferably has a position assigned to it through an ICD after the ICD has been docked in the PD. Such positioning information may be algorithmically updated with additional positioning information provided by other ICDs. Alternatively, a PD may have an ultra-precise GPS and/or ultra-precise orientation sensor to determine its absolute position.

Figure 4:
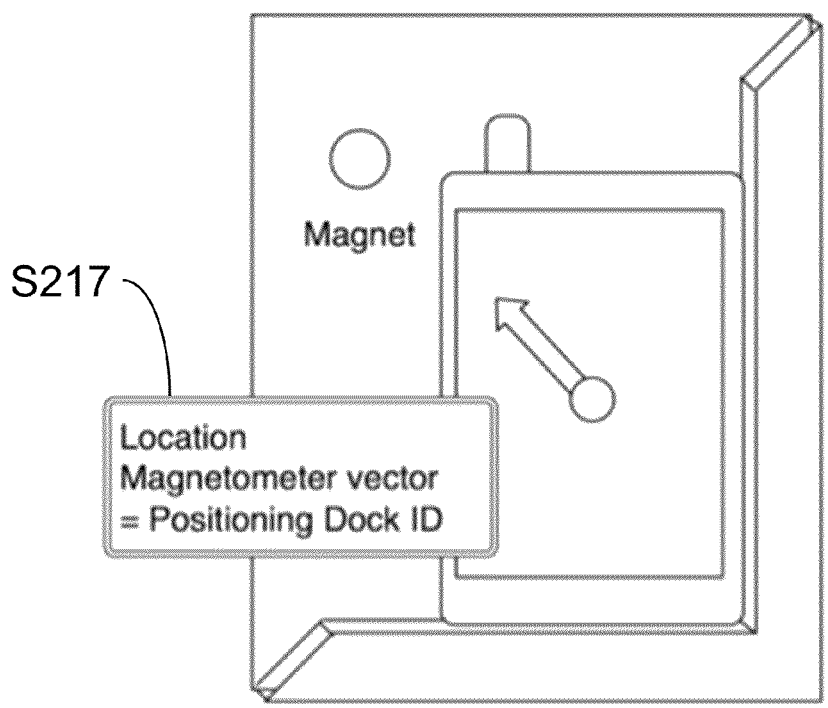
FIG. 4 is a detailed schematic representation of identifying a PD with a magnetometer.

Magnets may be additionally embedded within the PDs in the network 110. The ICD may verify that the ICD is in the correct position based on the sensed magnetic vector of a magnetometer, as shown in FIG. 4. Alternatively a proximity sensor, image sensor, touch sensor, or button may be used to verify correct positioning. The PDs in the network no preferably include identifying devices that may include code labels, barcodes or graphical identifiers, RFID tags, coded magnets, or any suitable devices to identify a PD. The PDs in one network preferably have the same structure and utilize the same method of verifying that the ICD is in the correct position. Alternatively the PDs in one network may not all match in these characteristics.

PDs in the local network no may be found in a conference room, a museum, a car, an office building, an airport, a home, or any suitable location where augmented reality or positioning applications may be used. Preferably, there are multiple PDs within a desired environment for convenient docking opportunities. A PD in the local network no is preferably mounted in a geographically fixed position. The PD may alternatively be mounted in a relatively fixed position within a moving environment such as a car, plane, or boat. In the variation where the PD is in a relatively fixed location, a reference-positioning device that tracks the inertial positioning of the environment is preferably used to provide a reference for motion of the moving environment.

The database 120 of the preferred embodiment functions to store information about the positions of the PDs within the network. The database preferably relates a calibrated position to a PD identity. The database is preferably stored on a remote cloud or server. The database may additionally be used to manage stored position-associated data, although such information may be stored and managed locally on an ICD. For example, the system may be used in a virtual graffiti application that stores position-associated graffiti in a room. Other friends of a user using the application may have posted graffiti at a certain position in the room. Several days later, the user may have access to the graffiti that was posted by friends. In this example, position-associated data is stored in the application.

The database preferably sends and receives messages to and from the ICD. Alternatively, the database may send and receive messages to and from a PD of the network. Communication between the database and the ICD or PD is preferably over a wireless network. This communication is preferably over a cellular network. Alternatively it may be enabled through the phone's WiFi capabilities or any other method of telecommunication.

The database 120 preferably stores data about a subset of PDs. The network of PDs preferably grows as the system gains usage. A database is preferably pre-populated with positional data about some subset of PDs. As more ICDs dock at new PDs outside of that subset, relative locations of the ICD to the PDs in the subset are compared with relative locations of the ICD to the PDs outside the subset to compute positions of the set of PDs outside of the subset. The positions of these new PDs are preferably added to the network via a data push to the database. In an alternative embodiment, all of the positions of PDs within the network are known and pre-populated in the database 120.

Although calls to the remote database 120 may be necessary for retrieval of absolute data, the system may also be functional when there is limited or no access to the remote database. For example, in a situation where the ICD may not have Internet or cellular network access and thus may not have access to a remote database, the ICD may still output a relational position of the ICD to a PD and use it in an application. Alternatively, the ICD may cache an absolute position of a PD and thus still be capable of determining absolute position of the ICD when there is limited or no connection to the remote database 120.

The information in the database 120 preferably has permanence. For example, positional data about PDs in a particular room may be stored in the database until another ICD or set of ICDs is used in that same room. Alternatively, the information in the database 120 may be periodically cleared.

The calculator 130 capable of determining, based on a position of a PD, the position of the ICD, preferably functions to track the relative position of the ICD while in use with the PD as a reference point. After the position of the ICD is synchronized with that of the PD, the calculator performs inertial based tracking techniques to calculate the relative position of the ICD. The calculator preferably uses an accelerometer and a gyroscope. The calculator may alternatively use any combination of a magnetometer compass, GPS, an imaging sensor, and/or any suitable sensor. Any suitable dead rocking or inertial navigation/positioning technique may be used. Additionally, the tracking of the ICD may feature the calculator refreshing a position of the ICD. The calculator is preferably within the ICD. Alternatively, a calculator may relay data to the ICD over a wireless network. This communication is preferably over a cellular network. Alternatively it may be enabled through the phone's Wi-Fi capabilities. In another embodiment, this communication may be over a physical wire or connection.

The calculator preferably outputs position data to the API 140 when a method in the API communicates to the calculator that position data is necessary. The calculator may cache position data so as to store data about a trajectory of the ICD from the PD that it was most recently docked in. Alternatively, the calculator may maintain position data for a few seconds and discard data about previous positions of the ICD.

The calculator 130 may also refresh the position of the ICD, as shown in S235, to recalibrate and account for any accumulative errors. Inertial based tracking may suffer from compounding errors. A freshness of positioning calibration may be presented to a user and replenished by docking an ICD in the original positioning dock or a second PD. Refreshing of position calibration may additionally retroactively account for errors. Past position-based actions preferably have positions reverse calculated from the refreshed docking position. So for example, in one application where the ICD is being used to take photographs and the exact position where the photographs was taken is being stored, photographs taken when the positioning calibration had fallen below a threshold may be reverse calculated from the new docking position.

The API 140, connected to the calculator and capable of outputting the position of a PD to the ICD, functions to relay the calibrated position of the ICD for use in an application. The API preferably outputs the position of the ICD to a mobile phone application. In one application the API may output position-associated data that is superimposed on an image. The location and orientation of the ICD when viewing the image is preferably used to map how position-associated data should be presented. Interactions may additionally be associated with location and orientation of the device. For example, applications and/or actions can preferably be activated when in a designated position. Any suitable application may alternatively make use of data relayed from the API 140. The positional information that is outputted may depend on the application that is retrieving the positional information. For example, in the graffiti example described above, the "position" of the ICD may be the precise location of the ICD. Meanwhile, in the museum example, the "position" of the ICD may be both the location and orientation of the ICD to enable users to point their ICDs towards a museum artifact and trigger an application action according to which artifact is pointed at.

As a person skilled in the art of augmented reality will recognize from this component of the detailed description and from the figures and claims, modifications and changes can be made to the preferred embodiments of the invention without departing from the scope of this invention defined in the claims.

2. Method for Determining Position of an Inertial Computing Device

Figure 2:
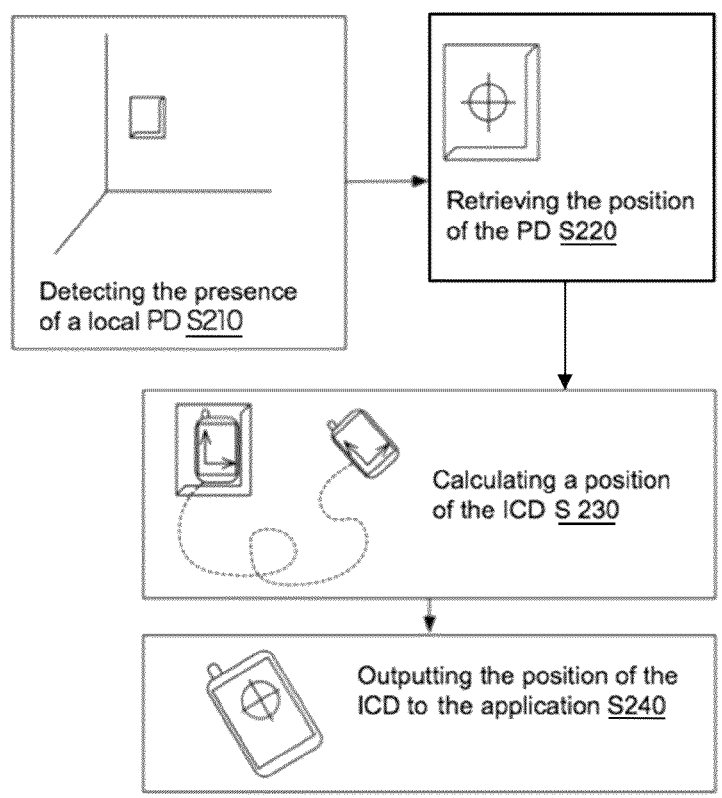
FIG. 2 is a flowchart representation of a method of a preferred embodiment of the invention.

As shown in FIG. 2, a method for determining position of an ICD of a preferred embodiment includes detecting the presence of a local PD through a physical acting of docking at the PD S210; retrieving from a remote database, the position of the PD S220; calculating, based on the position of the PD, a position of the ICD S230; and outputting the position of the ICD to the application S240.

The method preferably functions to create a distributed network of reference points useable by a plurality of devices to define coordinate systems. The method preferably enables ICDs to function with greater fidelity in detection of location and orientation because of the local calibration of the ICD. Additionally, because the calibration is generalized for any device, the positional data is preferably imbued with location permanence. The ICD is preferably a mobile phone, but may be any suitable computing devices with positioning and/or orientation sensing capabilities such as a laptop computer, a tablet computer, a game controller, or any device with suitable positioning technology. An ICD preferably includes a global positioning system (GPS), a gyroscope sensor, an accelerometer sensor, an electric compass/magnetometer, camera/imaging system, and/or any suitable sensor or device for positioning. In a preferred embodiment, "position" refers to location (e.g., geographical or local, 2D or 3D) and orientation (e.g., linear or rotational angle, velocity, acceleration etc.) of the ICD. Alternatively, position may refer to only location or only orientation. A PD is preferably a device that can receive the ICD and facilitates orienting the ICD in a singular position for synchronizing of positions. The method of functions to create a distributed network of reference points useable by a plurality of devices and offering high fidelity positioning for various applications. The method is preferably used to supply data to augmented reality-based applications through the ICD, but may alternatively be used for any suitable position-based application.

Step S210, which includes detecting the presence of a local PD through a physical act of docking at the PD, functions to assign a local standard or origin for synchronizing position of ICDs. "Docking" preferably implies restricting three dimensions of the physical position of the ICD near one of the PDs. The local standard or origin is preferably determined by a calibrated position. The calibrated position preferably includes the location of the PD within a global reference frame or coordinate system such as using GPS and additionally the orientation of the PD. The calibrated position may alternatively be a local reference frame with no reference to an external/global coordinate system. The calibrated position may alternatively include references to other local PDs. When calibrating the position of the PD, the position is preferably assigned to a PD identity stored in the database. Assigning the position to a PD identity preferably enables a network of PDs to be passive docks that facilitate orientating an ICD and distinguish the PD from other PDs. This preferably functions to enable PDs to be more affordable and ubiquitous within an environment. A PD preferably has a position assigned to it through an ICD after the ICD has been docked in the PD. Such positioning information may be algorithmically updated with additional positioning information provided by other ICDs. Alternatively, a PD may have an ultra-precise GPS and/or ultra-precise orientation sensor to determine its absolute position.

In step S210, the PD preferably uses a mechanically restraining receptacle that at least partially defines the position of the ICD. Forces provided by the user preferably enable the position to be fully defined, as shown in FIG. 3 where a user aligns an ICD into a three-walled corner of the PD (e.g., a back plate with two ridges that intersect at a right angle).

In step S210, the local PD may be identified in a plurality of ways. In one variation, the PD is preferably identified by a code displayed on the PD. The code can preferably be manually entered through the ICD or through any suitable interface to identify the PD. In another variation, an imaging device of the ICD may capture a barcode or any suitable graphical encoding of the identity of the PD. In another variation, the ICD preferably reads an RFID tag or QR tag included in the PD. In another variation shown in S217 of FIG. 3, a magnetometer of the ICD is preferably used to identify the PD. The PD preferably includes an embedded magnet or a series of magnetized strips/areas that encode an identity. Additionally or alternatively, the geographical location of the ICD (e.g., from a GPS signal) may be used to identify the PD or narrow the number of PDs from which the PD is distinguished.

In step 210, the local PD may be found in a conference room, a museum, a car, an office building, an airport, a home, or any suitable location where augmented reality or positioning applications may be used. Preferably, there are multiple PDs within a desired environment for convenient docking opportunities. The local PD in step 210 is preferably mounted in a geographically fixed position. The PD may alternatively be mounted in a relatively fixed position within a moving environment such as a car, plane, or boat. In the variation where the PD is in a relatively fixed location, a reference-positioning device that tracks the inertial positioning of the environment is preferably used to provide a reference for motion of the moving environment.

Step S220, which includes retrieving, from a database, the position of the PD, functions to distinguish a PD for mapping the position of the ICD with positional information associated with the PD. The step 220 preferably includes retrieving data from a remote database. Alternatively the data is retrieved from a local database. For example, the database may be stored on the ICD itself or on a computer that is in the same room as the ICD. When there is no opportunity for telecommunication (for example, when a cellular network is disabled), calls to a local database in step 220 will enable the method to still be functional. For example, in a situation where the ICD may not have Internet or cellular network access and thus may not have access to a remote database, the ICD may still output a relational position of the ICD to a PD and use it in an application. Alternatively, the ICD may cache an absolute position of a PD and thus still be capable of determining absolute position of the ICD when there is limited or no connection to the remote database 120.

The database may additionally be used to manage stored position-associated data, although such information may be stored and managed locally on the ICD. For example, the system may be used in a virtual graffiti application that stores position-associated graffiti in a room. Other friends of a user using the application may have posted graffiti at a certain position in the room. Several days later, the user may have access to the graffiti that was posted by friends. In this example, position-associated data is stored in the application.

The step S220 of retrieval preferably functions to enable absolute positioning. Before there is retrieval from a remote database, positions of PDs within a network may be known relative to another. The retrieval of data from a remote database preferably functions to imbue all of these relative positions with an absolute position. The retrieval from the remote database is preferably enabled through communication over a cellular network. Alternatively the retrieval of data may occur through the ICD's Wi-Fi capability, or any other method of telecommunication. Alternatively the ICD may retrieve a PD's absolute position from the database before any acts of docking take place.

The database preferably sends and receives messages to and from the ICD. Alternatively, the database may send and receive messages to and from a PD of the network. Communication between the database and the ICD or PD is preferably over a wireless network. This communication is preferably over a cellular network. Alternatively it may be enabled through the phone's Wi-Fi capabilities or any other method of telecommunication.

Step S230, which includes calculating, based on the position of the PD, a position of the ICD, functions to track the position of the ICD while in use with the PD as a reference point. Tracking the relative position of the ICD preferably includes the physical act of docking at the PD S215, as shown in FIG. 3. When the PD is docked, the position including location and orientation of the ICD and the PD are preferably synchronized. A calculator operating in association with the ICD (e.g., on the device or through input of the device) preferably synchronizes the ICD with the identified PD when the ICD is docked. After the position is synchronized, inertial based tracking techniques are a used to calculate the relative position of the ICD, preferably through the use of an accelerometer and a gyroscope. Alternatively, the inertial based tracking techniques may use any combination of the following: gyroscopic sensors, a magnetometer compass, accelerometer, GPS, imaging sensors, and/or any suitable sensor. Any suitable dead reckoning or inertial navigation/positioning techniques may be used. Additionally, the tracking of the ICD may include refreshing position of the ICD S235, which functions to recalibrate and account for any accumulative errors. Inertial based tracking may suffer from compounding errors. A freshness of positioning calibration may be presented to a user and replenished by docking an ICD in the original positioning dock or a second PD. Refreshing of position calibration may additionally retroactively account for errors. Past position-based actions preferably have positions reverse calculated from the refreshed docking position. So for example, in one application where the ICD is being used to take photographs and the exact position where the photographs was taken is being stored, photographs taken when the positioning calibration had fallen below a threshold may be reverse calculated from the new docking position.

The calculator of STEP 230 is preferably within the ICD. Alternatively, a calculator may relay data to the ICD over a wireless network. This communication is preferably over a cellular network. Alternatively it may be enabled through the phone's Wi-Fi capabilities. In another embodiment, this communication may be over a physical wire or connection. For example, the ICD may be linked to an external accelerometer or gyroscope through a wire.

STEP 240, which includes outputting the position of the ICD to the application, functions to send the calibrated position of the ICD to an application. The application preferably includes interacting with position-associated data. In one application position-associated data is preferably superimposed over an image. The location and orientation of the ICD when viewing the image is preferably used to map how position-associated data should be presented. Interactions may additionally be associated with location and orientation of a device. For example, applications and/or actions can preferably be activated when in a designated position. For example, the application may activate an alarm or music file to sound when the ICD is at a distinct position. Alternatively, the application may display a certain message when the ICD nears a certain artifact in a museum. Any suitable application may alternatively utilize the calibrated position of the ICD. The positional information that is outputted may depend on the application that is retrieving the positional information. For example, in the graffiti example described above, the "position" of the ICD may be the precise location of the ICD. Meanwhile, in the museum example, the "position" of the ICD may be both the location and orientation of the ICD to enable users to point their ICDs towards a museum artifact and trigger an application action according to which artifact is pointed at.

Figure 5:
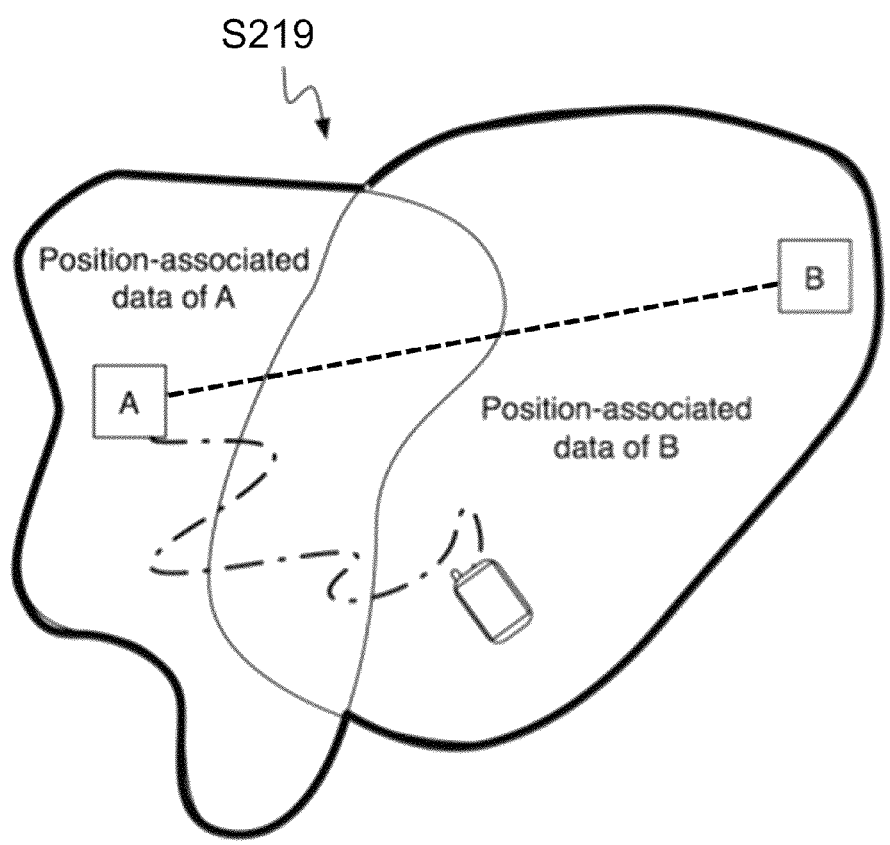
FIGS. 5 and 6 are detailed schematic representations of a network of PDs.
Figure 6:
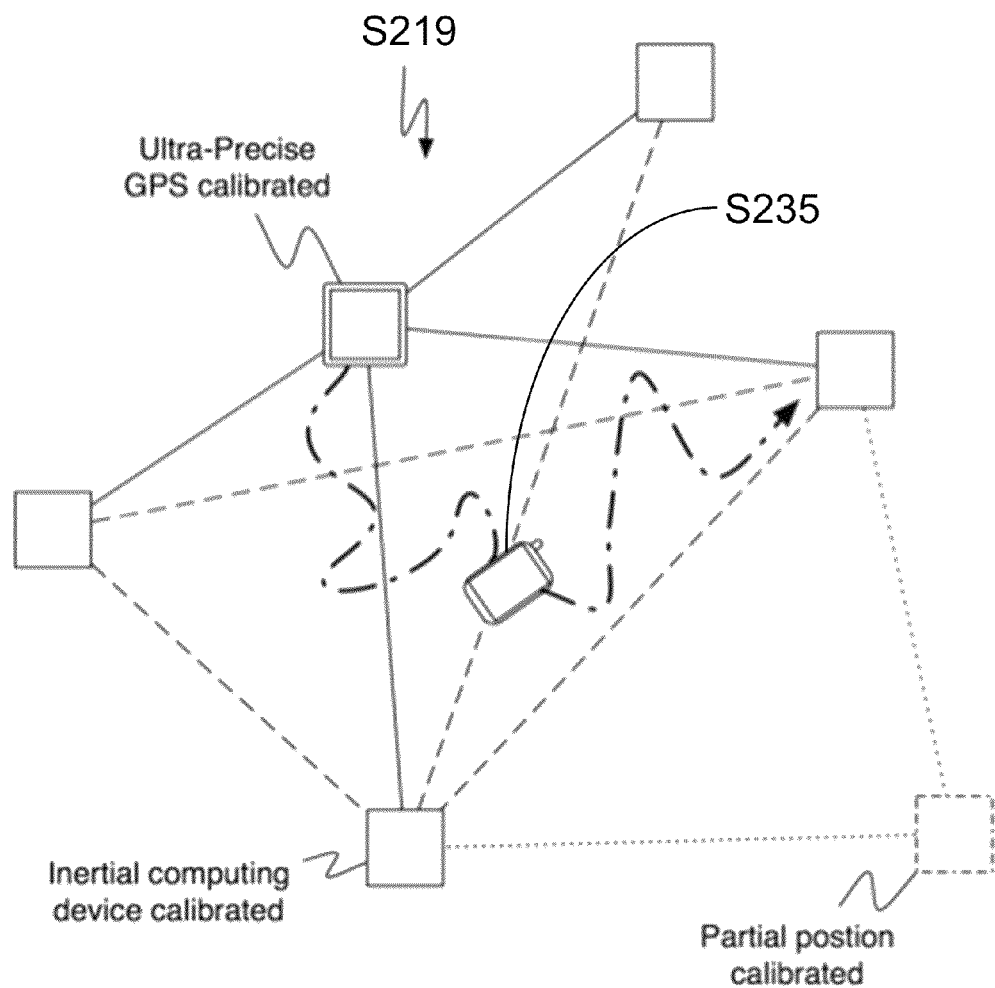

Additionally as shown in FIGS. 5 and 6, the method of the preferred embodiment preferably includes merging relative positions of at least two PDs S219, which functions to network the position information of PDs. Merging of relative positions of at least two PDs preferably requires an inertial computing device to be docked in at least two PDs. When merging relative positions of two PDs, the tracked relative position of the ICD to a first PD when the ICD is docked in a second PD is preferably used to calculate the relative position between the two PDs. This relative position is preferably updated and modified during subsequent docking events that have new data. A network of position information relating PDs is preferably created through the merging of relative positions. Additionally, the position-associated data created in relation to a first PD can preferably be translated to a second PD, such that multiple PDs may be used to interact with the same position-associated data, as shown in FIG. 5. Both PDs are preferably calibrated, though a PD may be calibrated based on the calibration of another PD. Additionally, the calibration of a PD may be adjusted based on calibration of other PDs and the tracked relative position of the ICD when docked. The fidelity of calibration of a PD may be used as a weighting parameter when modifying the calibration of a PD, and the freshness of calibration for tracked relative position may additionally be a weighting parameter. As shown in FIG. 6, the fidelity of calibration of a PD can preferably spread to other PDs when merging relative positions. In one example, some PDs are preferably calibrated with ultra-precise GPS, some are calibrated through a GPS of an ICD, and some may have not been initially calibrated with location and/or orientation information. The calibration of the ultra-precise GPS is preferably transferred to other PDs during subsequent dockings of an ICD. Un-calibrated PDs can additionally have calibration supplied through the tracked position of an ICD.

An alternative embodiment preferably implements the above methods in a computer-readable medium storing computer-readable instructions. The instructions are preferably executed by computer-executable components preferably integrated with an ICD. The computer-readable medium may be stored on any suitable computer readable media such as RAMs, ROMs, flash memory, EEPROMs, optical devices (CD or DVD), hard drives, floppy drives, or any suitable device. The computer-executable component is preferably a processor but the instructions may alternatively or additionally be executed by any suitable dedicated hardware device.

As a person skilled in the art of augmented reality will recognize from the previous detailed description and from the figures and claims, modifications and changes can be made to the preferred embodiments of the invention without departing from the scope of this invention defined in the following claims.

I claim:

1. A system comprising:
a plurality of positioning docks each configured to physically confine a mobile computing device on three sides in a fixed position and orientation when the mobile computing device is docked with the respective positioning docks, wherein an estimated physical position and orientation of each respective positioning dock is stored for each of the plurality of positioning docks;
a database configured to store information indicative of the estimated physical positions and orientations of each of the plurality of positioning docks, each of the plurality of positioning docks being associated with a unique identifier; and
a processor configured to:
receive a first indication of a first unique identifier associated with a first positioning dock of the plurality of positioning docks at which the mobile computing device was docked at a first point in time;
receive a second indication of a second unique identifier associated with a second positioning dock of the plurality of positioning docks at which the mobile computing device was docked at a second point in time, the second point in time being later than the first point in time;
receive accelerometer position and orientation data provided by an accelerometer of the mobile computing device between the first point in time when the mobile computing device was docked at the first positioning dock and the second point in time when the mobile computing device was docked at the second positioning dock;
determine an update to the estimated physical position and orientation of the second positioning dock by at least:
accessing, using the first indication of the first unique identifier, and from the database, the estimated physical position and orientation of the first positioning dock;
accessing, using the second indication of the second unique identifier, and from the database, the estimated physical position and orientation of the second positioning dock; and
calculating, based on the estimated physical positions and orientations of the respective first and second positioning docks and the accelerometer position and orientation data, the update to the estimated physical position and orientation of the second positioning dock; and
store, in the database, an updated estimated physical position and orientation of the second positioning dock based on the update.

2. The system of claim 1, wherein the plurality of positioning docks are mounted in relatively fixed positions within a moving environment such as a car, phone, or boat.

3. The system of claim 2, further comprising a reference-positioning device that tracks inertial positioning of the moving environment to provide a reference for its motion.

4. The system of claim 1, wherein each of at least some of the plurality of positioning docks includes a sticker displaying the associated unique identifiers, the sticker useable by an operator of the mobile computing device to manually enter the unique identifiers into the mobile computing device.

5. The system of claim 1, wherein each of at least some of the plurality of positioning docks includes a graphical encoding including the associated unique identifier, the graphical encoding detectable with an imaging device on the mobile computing device.

6. The system of claim 1, wherein each of at least some of the plurality of positioning docks is configured to relay identifying information, including the associated unique identifier, to the mobile computing device through a magnetometer.

7. The system of claim 1, wherein each of at least some of the plurality of positioning docks includes RFID tags useable to be scanned by the mobile computing device to obtain the associated unique identifiers.

8. The system of claim 1, wherein global positioning system coordinates of the mobile computing device are used to identify each of at least some of the plurality of positioning docks.

9. The system of claim 1, wherein the estimated physical positions and orientations of each of the plurality of positioning docks comprises an estimated absolute position and orientation of each of the plurality of positioning docks.

10. The system of claim 1, wherein the processor is further configured to:
receive gyroscope position and orientation data provided by a gyroscope of the mobile computing device between the first point in time when the mobile computing device was docked at the first positioning dock and the second point in time when the mobile computing device was docked at the second positioning dock,
wherein determining the update to the estimated physical position and orientation of the second positioning dock further includes:
calculating, based on the estimated physical positions and orientations of the respective first and second positioning docks, the accelerometer position and orientation data, and the gyroscope position and orientation data, the update to the estimated physical position and orientation of the second positioning dock.

11. The system of claim 1, wherein the information indicative of the estimated physical positions and orientations of each of the plurality of positioning docks is useable to determine estimated positions and orientations of any of a plurality of mobile computing devices.

12. The system of claim 1 further comprising:
an application programming interface in communication with the database and configured to provide the estimated positions and orientations of each of the plurality of positioning docks to the mobile computing device.

13. The system of claim 1, wherein the processor is further configured to:
determine an estimated physical position and orientation of the mobile computing device by at least:
accessing, using the first indication of the first unique identifier, and from the database, the estimated physical position and orientation of the first positioning dock; and
calculating, based on the estimated physical position and orientation of the first positioning dock and the accelerometer position and orientation data, the estimated physical position and orientation of the mobile computing device.

14. The system of claim 13, wherein the estimated physical position and orientation of the mobile computing device is an estimated physical position and orientation of the mobile computing device at a third point in time later than then first point in time and earlier than the second point in time.

15. A method comprising:
by one or more processors configured with computer executable instructions,
providing a plurality of positioning docks each configured to physically confine a mobile computing device on three sides in a fixed position and orientation when the mobile computing device is docked with the respective positioning docks, wherein an estimated physical position and orientation of each respective positioning dock is stored for each of the plurality of positioning docks;
providing a database configured to store information indicative of the estimated physical positions and orientations of each of the plurality of positioning docks, each of the plurality of positioning docks being associated with a unique identifier;
receiving a first indication of a first unique identifier associated with a first positioning dock of the plurality of positioning docks at which the mobile computing device was docked at a first point in time;
receiving a second indication of a second unique identifier associated with a second positioning dock of the plurality of positioning docks at which the mobile computing device was docked at a second point in time, the second point in time being later than the first point in time;
receiving accelerometer position and orientation data provided by an accelerometer of the mobile computing device between the first point in time when the mobile computing device was docked at the first positioning dock and the second point in time when the mobile computing device was docked at the second positioning dock;
determining an update to the estimated physical position and orientation of the second positioning dock by at least:
accessing, using the first indication of the first unique identifier, and from the database, the estimated physical position and orientation of the first positioning dock;
accessing, using the second indication of the second unique identifier, and from the database, the estimated physical position and orientation of the second positioning dock; and
calculating, by the one or more processors and based on the estimated physical positions and orientations of the respective first and second positioning docks and the accelerometer position and orientation data, the update to the estimated physical position and orientation of the second positioning dock; and
determining an estimated physical position and orientation of the mobile computing device by at least:
accessing, using the first indication of the first unique identifier, and from the database, the estimated physical position and orientation of the first positioning dock; and
calculating, by the one or more processors and based on the estimated physical position and orientation of the first positioning dock and the accelerometer position and orientation data, the estimated physical position and orientation of the mobile computing device; and
outputting the estimated position of the mobile computing device to an application executing on the mobile computing device.

16. The method of claim 15 further comprising:
by one or more processors configured with computer executable instructions,
receiving second accelerometer position and orientation data provided by the accelerometer of the mobile computing device between the second point in time when the mobile computing device was docked at the second positioning dock and a third point in time when the mobile computing device was docked at a third positioning dock; and
determining an second estimated physical position and orientation of the mobile computing device by at least:
accessing, using the first and second indication of the respective first and second unique identifiers, and from the database, the estimated physical positions and orientations of the respective first and second positioning docks; and
calculating, by the one or more processors and based on the estimated physical positions and orientations of the first and second positioning docks and the accelerometer and second accelerometer position and orientation data, the second estimated physical position and orientation of the mobile computing device.

17. The method of claim 16, wherein the second estimated physical position and orientation of the mobile computing device is an estimated physical position and orientation of the mobile computing device at a fourth point in time later than then second point in time and earlier than the third point in time.

18. The method of claim 15, wherein the plurality of positioning docks are mounted in relatively fixed positions within a moving environment such as a car, phone, or boat.

19. The method of claim 18, further comprising tracking inertial positioning of the moving environment to provide a reference for its motion.

20. The method of claim 15, wherein the mobile computing device is a device with suitable positioning technology selected from a group consisting of a mobile phone, a lap top computer, a tablet computer, a game controller, or another device with suitable positioning technology.

21. The method of claim 15, wherein each of at least some of the plurality of positioning docks includes a sticker displaying the associated unique identifiers, the sticker useable by an operator of the mobile computing device to manually enter the unique identifiers into the mobile computing device.

22. The method of claim 15, wherein each of at least some of the plurality of positioning docks includes a graphical encoding including the associated unique identifier, the graphical encoding detectable with an imaging device on the mobile computing device.

23. The method of claim 15, wherein each of at least some of the plurality of positioning docks is configured to relay identifying information, including the associated unique identifier, to the mobile computing device through a magnetometer.

24. The method of claim 15, wherein each of at least some of the plurality of positioning docks includes RFID tags useable to be scanned by the mobile computing device to obtain the associated unique identifier.

25. The method of claim 15, wherein global positioning system coordinates of the mobile computing device are used to identify each of at least some of the plurality of positioning docks when the mobile computing device is docked to each of the at least some of the plurality of positioning docks.

26. The method of claim 15, wherein the estimated physical positions and orientations of the first and second positioning docks are useable to determine estimated positions and orientations of any of a plurality of mobile computing devices.

27. The method of claim 15, wherein the database is remote from the mobile computing device and the plurality of positioning docks.

28. A computer readable memory storing a computer program executable by a processor, the computer program performing a method comprising:
- providing a plurality of positioning docks each configured to physically confine a mobile computing device on three sides in a fixed position and orientation when the mobile computing device is docked with the respective positioning docks, wherein an estimated physical position and orientation of each respective positioning dock is stored for each of the plurality of positioning docks;
- providing a database configured to store information indicative of the estimated physical positions and orientations of each of the plurality of positioning docks, each of the plurality of positioning docks being associated with a unique identifier;
- receiving a first indication of a first unique identifier associated with a first positioning dock of the plurality of positioning docks at which the mobile computing device was docked at a first point in time;
- receiving a second indication of a second unique identifier associated with a second positioning dock of the plurality of positioning docks at which the mobile computing device was docked at a second point in time, the second point in time being later than the first point in time;
- receiving accelerometer position and orientation data provided by an accelerometer of the mobile computing device between the first point in time when the mobile computing device was docked at the first positioning dock and the second point in time when the mobile computing device was docked at the second positioning dock;
- determining an update to the estimated physical position and orientation of the second positioning dock by at least:
  - accessing, using the first indication of the first unique identifier, and from the database, the estimated physical position and orientation of the first positioning dock;
  - accessing, using the second indication of the second unique identifier, and from the database, the estimated physical position and orientation of the second positioning dock; and
  - calculating, based on the estimated physical positions and orientations of the respective first and second positioning docks and the accelerometer position and orientation data, the update to the estimated physical position and orientation of the second positioning dock;
- storing, in the database, an updated estimated physical position and orientation of the second positioning dock based on the update; and
- determining an estimated physical position and orientation of the mobile computing device by at least:
  - accessing, using the first indication of the first unique identifier, and from the database, the estimated physical position and orientation of the first positioning dock; and
  - calculating, based on the estimated physical position and orientation of the first positioning dock and the accelerometer position and orientation data, the estimated position and orientation of the mobile computing device.

29. The computer readable memory of claim 28, wherein the method further comprises:
- using the estimated position and orientation of the mobile computing device in an application executing on the mobile computing device.

* * * * *